Sept. 3, 1957 R. G. STRAUSS 2,804,648
PLASTIC BLOW MOLDING APPARATUS
Filed May 13, 1954 3 Sheets-Sheet 1

INVENTOR
ROBERT G. STRAUSS
BY Bates + Willard
ATTORNEYS

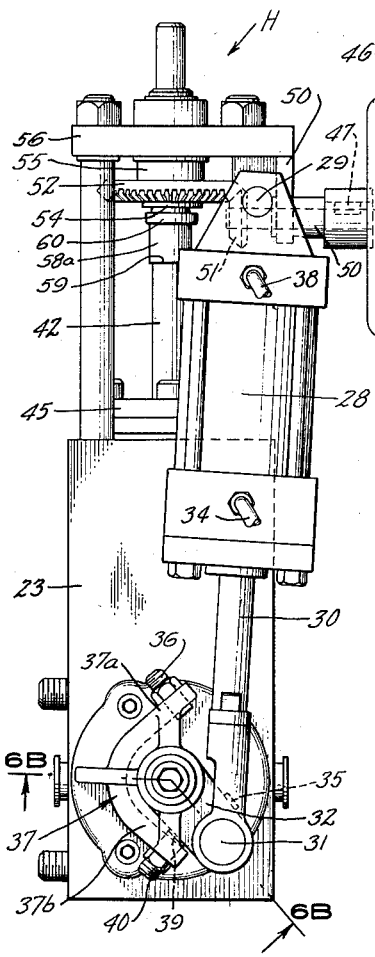

Sept. 3, 1957  R. G. STRAUSS  2,804,648
PLASTIC BLOW MOLDING APPARATUS
Filed May 13, 1954  3 Sheets-Sheet 3
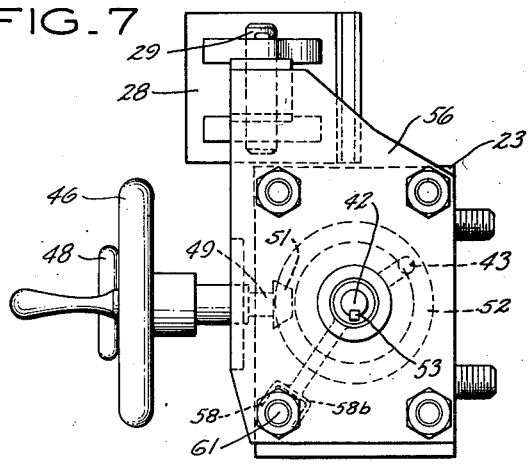
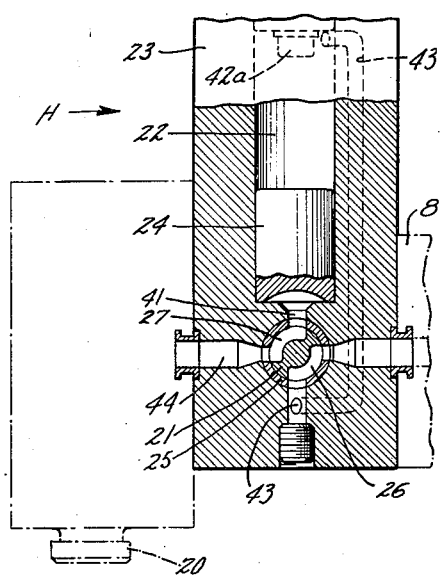
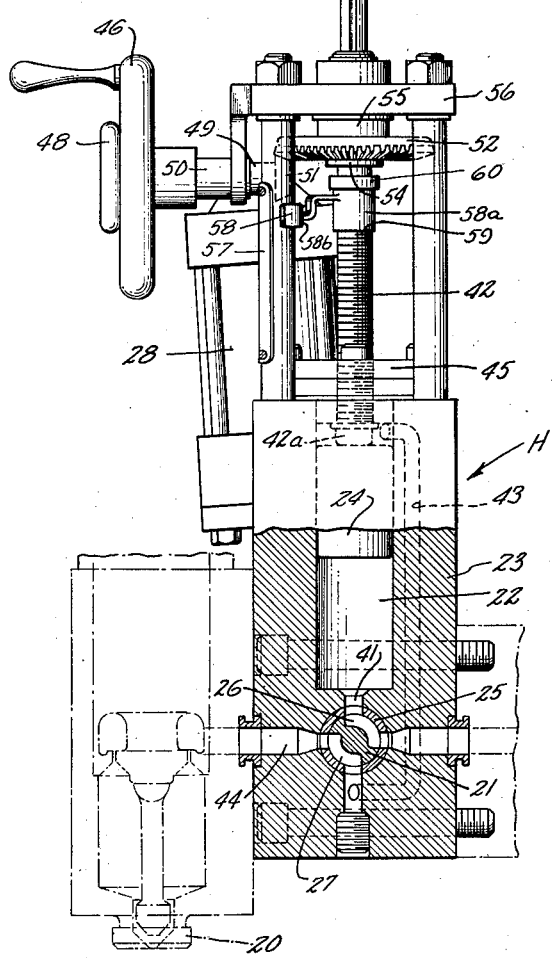
INVENTOR
ROBERT G. STRAUSS
BY Bates + Willard
ATTORNEYS

United States Patent Office 2,804,648
Patented Sept. 3, 1957

2,804,648

PLASTIC BLOW MOLDING APPARATUS

Robert G. Strauss, Hartford, Conn., assignor to Plax Corporation, West Hartford, Conn., a corporation of Delaware Application May 13, 1954, Serial No. 429,439

2 Claims. (Cl. 18—30)

This invention relates to machines for extruding and blow-molding plastic materials, hereinafter referred to as plastics, and has for its general object the provision of a new and improved measuring apparatus for machines of this type by the use of which the plastic for successive blown articles may be measured and supplied accurately for molding.

Generally, machines embodying the invention plasticate molding powder under heat and substantial working pressure of the order of 1000 to 10,000 p. s. i. and extrude or otherwise discharge a preselected amount of the plastic material under pressure of the order of 100 to 1000 p. s. i. in the form of a tube. Thereafter the tube is blow-molded within one or more molds into one or more bottles or other blown articles, all in an integrated process in which rigidification of the plastic is effected while the articles are maintained fully expanded and formed in the blow molds.

More particularly, the invention provides improved means for controlling the measurement of the plastic in each successive tubular or other discharge. The invention also purovides a machine of the type indicated in which surging and uneven discharge of plastic is substantially avoided and in which the continuous pressure of plastication also provides the intermittent pressure for the successive measured discharges.

More particularly, it is an object to utilize the continuous pressure under which plastic is supplied to a measuring cylinder to operate a metering piston which discharges successive measured charges for the cylinder.

Other objects and advantages of the invention will be pointed out or will be apparent from the following description, having reference to the accompanying drawings, in which:

Fig. 3 is an enlarged front elevation view partially broken away of measuring and feeding portions of the apparatus shown in Figs. 1 and 2;

Fig. 4 is a side elevation view taken from the right of Fig. 3;

Fig. 5 is a side elevation view taken from the left of Fig. 3;

Fig. 6 is the cross-sectional view the left hand portion of which is taken on line 6A—6A and the right hand portion of which is taken on line 6B—6B of Figs. 3 and 5;

Fig. 7 is a top plan view of the apparatus shown in Fig. 3; and

Fig. 8 is a view of the lower portion of Fig. 4 with the rotary valve in the other of its two positions.

Figure 1:
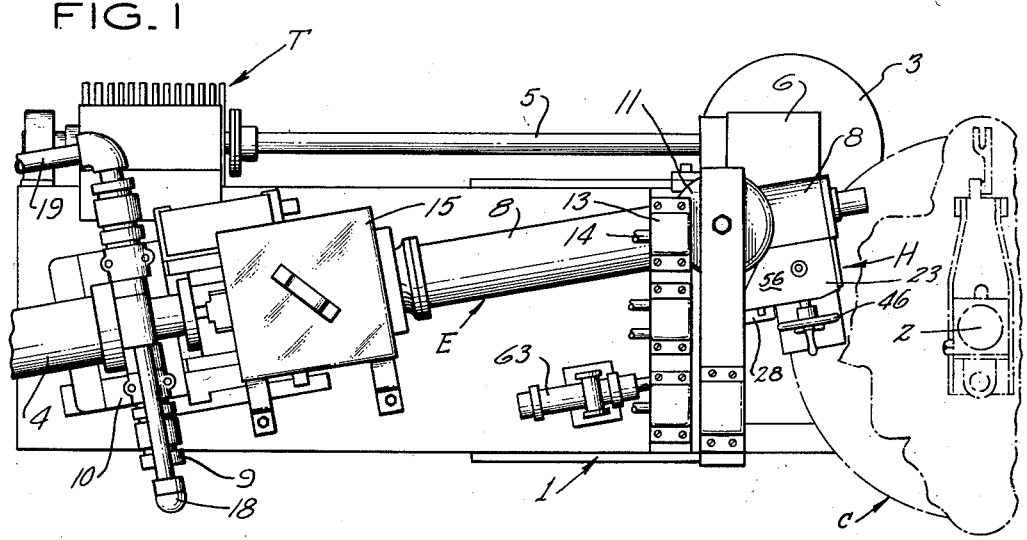
Figure 1 is a plan view of plasticizing, extruding and blow-molding apparatus embodying the invention.

Referring to the drawings, there is shown an extruder, indicated generally at E, having a head H through which plastic material is delivered periodically in tubular shape to each of the molds M on a rotary mold carrier which is shown in phantom and indicated generally at C. The mold carrier C may be rotated step by step by a Geneva drive or other suitable mechanism (not shown). There is provided a timer T having valves (not shown) which control the delivery of air or other fluid for blow-molding the extruded plastic material and for timing and coordinating the operations of the several components of the machine.

Figure 2:
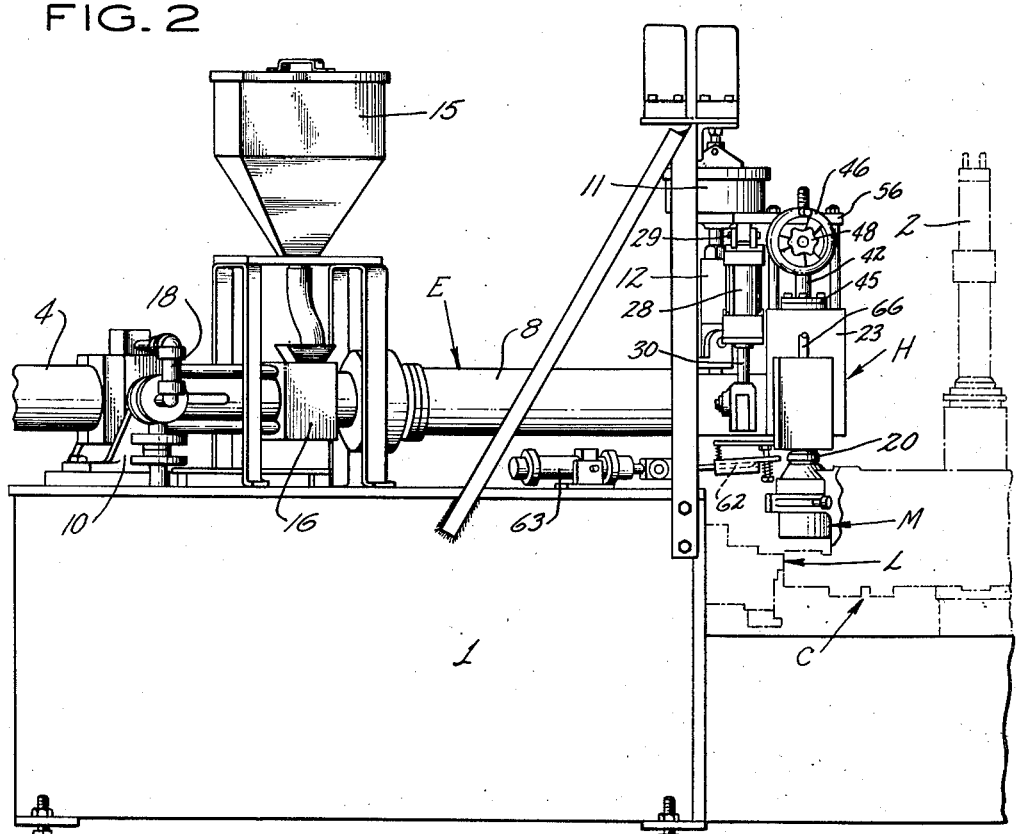
Fig. 2 is an elevational view of the apparatus shown in Fig. 1.

A base 1 on which the extruding device E is mounted, as shown in Figs. 1 and 2, also provides a platform upon which the rotary mold carrier C is mounted for rotation about a vertical column 2.

A motor 3 is mounted on the base and operates a horizontal drive shaft 5 through a speed reducer 6, the shaft 5, as best shown in Fig. 1, being coupled to the drum of the timer T. The motor 3 also may operate an oil pump (not shown) which supplies oil under pressure to operate a reciprocating ram 4 of the extruder E. The extruder E comprises an elongate generally tubular casing 8 which, as shown in Fig. 1, may be angularly disposed to the diameter of the circular carrier C. The extruder E is pivotally mounted at its rear end portion on horizontal trunnions 9 journaled in the brackets 10 to permit an up-and-down pivotal movement of the forward or head portion H of the extruder. The pivotal movement is effected by the piston of a fluid motor 11 which is connected to the extruder casing 8 by a connecting rod 12 and which is operated by air or other hydraulic pressure medium supplied through valve block 13 and line 14 at intervals from the timer T to raise the extruder head H. Downward movement of the head H, when the pressure in line 14 is relieved, may be cushioned by a compression spring (not shown) or by controlled bleeding of pressure medium from the cylinder 11, or by other suitable cushioning means.

The extrusion unit E includes a hopper 15 from which plastic molding powder is fed into a heated cylinder 16 of the extruder from which it is forced through the cylinder 16 by the piston (not shown) of the ram 4 responsive to the control of the timer T.

The plastic molding powder supplied from the hopper 15 into the cylinder 16 is forced by the ram 4 through the cylinder 8, and in both cylinders 8 and 16 is plasticated by working and heating. A pressure medium, such as oil, may be supplied and exhausted through lines 18 and 19 entering and leaving through the trunnions 9 to operate the ram 4.

The heretofore described extruder E is merely illustrative of plasticating and pressure applying units suitable for preparing plastic material for molding, while intermittently and continuously rotating screw type extruders are suitable.

Generally it will be found desirable in the case of a continuously rotated screw extruder to provide a pressure regulating accumulator or other means to assure that plastic discharges from the extruder cylinder 8 to the extrusion head H at a preselected substantially constant pressure.

The head H receives the plastic material which has been heated and worked to the desired condition of plasticity as a result of its passage through the cylinder 8 and, as hereinafter described, periodically discharges a measured amount of the softened plastic from an extrusion nozzle 20.

More particularly, as shown in Figs. 3 to 6, the plasticated thermoplastic material is supplied from the extruder cylinder 8 through a valve 21 into a cylindrical chamber 22 in a block 23 which is a component of the head H. In accordance with the present invention, the plastic is discharged in preselected amounts from the chamber 22 by a floating piston 24 responsive to the extruder pressure on the material supplied by the extruder E to the valve 21.

More particularly, the valve 21 is operated to direct the plastic alternately to opposite ends of the chamber 22 and the floating piston 24 sweeps identical charges successively from each end of the chamber 22 and out the extrusion nozzle 20.

As shown in the drawings, the valve 21 is a generally cylindrical member horizontally disposed within a bearing sleeve 25 in the block 23. The valve 21 is provided with spaced arcuate passages 26 and 27, each of which extends slightly more than 90° about the periphery of the valve and is located diametrically opposite the other.

In the illustrated embodiment of the invention, actuation of the valve 21, between the two positions shown in Figs. 4 and 8, is effected by a cylinder motor 28 responsive to the periodic supply of operating pressure fluid from the timer T. As shown in Figs. 3 and 5, the motor 28 is pivotally hinged from a fixed pin 29 and piston rod 30 of the motor is pivotally secured to a pin 31 on a crank 32 which is secured against rotation on the valve 21 by a spline 33. The valve 21 is rotated clockwise from the position shown in Fig. 4 to the position shown in Fig. 8, by the motor 28 responsive to air or other pressure fluid supplied from the timer T to raise the piston rod 30. Rotation of the valve 21 in the clockwise direction, as viewed in Fig. 4, corresponds to rotation in the opposite or counterclockwise direction as observed in Fig. 5, and is limited by engagement of a stop button 35 on the crank 32 with a stop screw 36 adjustably carried by an arm 37a of a U-bracket 37 which is secured to the block 23.

Counter rotation of the valve 21 is effected by timer supplied air to motor inlet 38 which advances the piston rod 30 and rotates the valve 21 clockwise (Fig. 5) the approximately quarter-turn permitted before engagement of a button 39 on the crank 32 with a stop screw 40 adjustably secured in arm 37b of the fixed bracket 37.

The valve 21 in the position shown in Fig. 4 directs the plastic into the measuring cylinder 22 through the arcuate valve passage 26 and a lower passage or port 41 beneath the floating piston 24. The plastic forces the piston 24 upwardly until the piston engages end 42a of an adjustable stop 42 and the plastic has filled the cylinder 22 beneath the raised piston 24. The upward movement of the piston 24 forces from the cylinder 22 through upper passage or port 43 the plastic which filled the cylinder 22 above the piston 24 when the piston was in the low position shown in Fig. 8. The plastic thus discharged through the passage 43 is directed through the valve passage 27 into a passage 44 and out through the nozzle 20. It will be seen that a charge equal to the volume of the chamber 22 swept by the floating piston 24 is extruded from the nozzle 20 which is annular so as to shape a tubular preform for blow-molding within one of the molds M on the carrier C.

Thereafter, the carrier C may be advanced to position another of the molds M beneath the nozzle 20 for repetition of the extrusion and molding operations. The valve 21 is rotated by the motor 28 responsive to the timer T to the position shown in Fig. 8 whereupon pressure exerted by the extruder E on the plastic is directed by the valve passage 26 and the upper passageway or port 43 and fills the measuring chamber 22 above the floating piston 24 with a measured charge while causing the piston 24 to force an identical charge from the chamber 22 through the lower port 41 and the valve passage 27 and to extrude the charge from the nozzle 20 as a tubular preform.

The size of the measured charge is determined by the stroke displacement of the piston 24. Since the travel of the piston 24 is identical in each direction, successive charges are identical. The length of the piston travel may be adjusted to provide a desired size of charge by adjustment of the stop 42 which is threaded through head 45 of the block 23 and may be advanced and retracted by rotation of a hand wheel 46.

As shown in Figs. 3–5, the hand wheel 46 is secured by a key 47 and nut 48 to a shaft 49 which is rotatably mounted in a stationary bearing 50 and to the inner end of which is secured a bevel gear 51 which engages a second bevel gear 52 that is slidably secured for rotation with the stop 42 by a key 53 and restrained against travel in an axial direction by bearing sleeves 54 and 55 which are fixedly secured in a stationary frame plate 56.

The position of adjustment of the stop 42 is indicated on a scale 57 by a pointer 58, hub 58a of which is secured on the stop shaft 42 against shoulder 59 by a collar 60 and is restrained against rotation on the stop shaft 42 by a yoke portion 58b of the pointer 58 which straddles fixed vertical post 61 on which is located the scale 57.

The plastic which issues in tubular shape from the die 20 may be severed by means of a knife 62 which, as shown in Fig. 2, is longitudinally reciprocable by a timer controlled air motor 63 to clean or shear off all the plastic below the bottom of the nozzle 20.

When the tilt cylinder 11 responsive to the timer T is raised the extruder E on its trunnions 9, the air motor 63 is actuated to advance the knife 62 across the bottom of the nozzle 20 and when the extruder E is lowered, the motor 63 acts to retract the knife 62 into the position in which it is shown in Fig. 2.

Temperature controlling medium is caused to flow through various passages within the extruding unit E to regulate the temperature of the plastic and, as shown in Figs. 3 and 6, similar passages 65 are provided in the head H to maintain the plastic at the desired temperature and viscosity throughout the extruding operation. It is preferable to use oil as the temperature controlling medium and a suitable source of oil and heating means (not shown) may be provided. If desired, electric heating units (not shown) may supplement or be substituted for temperature control by oil.

Blowing air or other suitable pressure fluid is admitted to and exhausted from an air tube 66 under control of the timer T. The air may be supplied in various ways. It may for example be supplied as a low pressure puff which is trapped within the hollow plastic material or it may be admitted to the interior of the plastic material at high pressure and, at a selected time, discontinued and any air in the air-tube 66 vented to atmosphere. The air is supplied through the air tube 66 into the interior of the plastic material prior to the time when the knife 62 operates to sever the extruded material contained in one of the molds M from the material in the extrusion nozzle 20.

It will be understood that the various molds M are located successively at the extruding and blowing position and opened and closed when necessary as the carrier C advances.

The operation of the entire machine will be understood from the preceding description and from the following summary of operation.

A complete machine cycle consists of four quarter turns of mold carrier C, and for each quarter turn of the carrier, the extruder E and associated parts go through a complete cycle of operations in cooperative relation to one of the molds M on the carrier. Therefore, timer T turns four full revolutions during a single machine cycle.

The various parts of the machine are shown in the drawings in the positions which they occupy when the mold carrier C is at rest with a mold M beneath and in axial alignment with the extrusion nozzle 20 of the extrusion head H.

More particularly, the parts of the machine are shown in those positions which they occupy at that period in the machine cycle prior to tilting the extruder E downward so as to position the die 20 on a mold M and prior to the extrusion of plastic tubing from the die 20 into a mold preparatory to blow molding of an article.

The extruder E is pivoted on its trunnions 9 by relieving the pressure in the tilt cylinder line 14 whereupon the timer T supplies air or other pressure medium to the motor 28 through the line 34 to raise the rod 30 and rotate the valve 21 through 90° from the position shown in Fig. 4 to the position shown in Fig. 8. Thereupon the valve 21 relieves the plastic material in the bottom of the chamber 22 of connection through valve passage 26 with the high pressure of the plastic in the extruder E and connects line 43 through valve passage 26 with the high pressure of the plastic in the extruder which thereupon fills the chamber 22 above the piston 24 and forces the piston to sweep a measured charge from the cylinder 22 and extrudes the charge in tubular shape from the nozzle 20. The mold M closes about the plastic tube suspended from the nozzle 20 and air is introduced from the timer T through the line 66 to blow the plastic tubing into conformity with the cavity of the mold where it is cooled and set while maintained under the superatmospheric internal blowing pressure.

Therafter the extruder E and head H are raised by actuation of the tilt cylinder motor 11 and the knife is advanced by its operating motor 63 responsively to pressure medium supplied from the timer T thereby severing the plastic along the bottom of the nozzle 20.

The mold M is thereupon advanced by a 90° rotation of the carrier and the following mold from which a blown article has been ejected moves into position beneath the extrusion nozzle 20.

Thereafter, air is exhausted from line 34 and supplied by the timer T through line 38 to the motor 28 which lowers the piston rod 30 and rotates the valve 21 to the position shown in Fig. 4. Thereupon, the valve passage 26 connects the passage 41 with the high pressure plastic in the extruder which fills the chamber 22 from the bottom and forces a measured charge from the chamber 22 through passage 43 and valve passage 27 and out of the nozzle 20.

When the following mold arrives beneath the extrusion head H, the head is lowered, the mold M is closed and the blow-molding cycle repeated. If desired, the carrier C may be locked by locking mechanism generally designated L under the control of the timer T while the extrusion and blowing operations are performed.

Various changes may be made in the details of construction and mode of operation of the illustrated embodiment of the invention without departing from the scope of the appended claims.

The invention is limited to use with organic plastic materials capable of being softened by heat and pressure and of being maintained at a low viscosity by transfer of heat thereto through metal walls without permanently or objectionably sticking to the metal surfaces in order to permit the material to be delivered in heat-softened workable condition, shaped into an article and rigidified. Various types of organic plastic materials meeting the above requirements may be formed into hollow articles of various shapes by the machine of this invention. Such materials may be supplied to the hopper of the machine in a solid state and it is intended that the plastic materials be so delivered to the machine although some materials at least may be delivered to the machine in pre-softened condition.

I claim:

1. Apparatus for forming articles from organic resin material, comprising an extruder for bringing the material to a plastic and moldable condition including means for applying pressure to the material, an extrusion nozzle arranged to receive plastic material from the extruder, a mold in which an article is to be formed from material extruded from said nozzle, a heated measuring chamber intermediate, said extruder and said nozzle, a floating piston in said chamber, a valve for selectively connecting the extruder with the chamber on opposite sides of the floating piston and for concurrently connecting the chamber on the opposite side of the piston from the side connected to the extruder with the extrusion nozzle, means for oscillating the valve to connect the extruder with the chamber on alternate sides of the piston and adjustable stop means for limiting the oscillation of the valve between selected limiting positions in connecting the extruder through the valve with the opposite sides of the chamber.

2. Apparatus for forming articles from organic resin material, comprising means for bringing the material to a plastic and moldable condition including means for applying pressure to the material, a nozzle arranged to receive plastic material from the pressure means, a mold in which an article is to be formed from material discharged from said nozzle, a heated measuring chamber intermediate said pressure means and said nozzle, a floating piston in said chamber, a valve for selectively connecting the pressure means with the chamber on opposite sides of the floating piston and for concurrently connecting the chamber on the opposite side of the piston from the side connected to the pressure means with the discharge nozzle, means for oscillating the valve to connect the pressure means with the chamber on alternate sides of the piston and adjustable stop means for limiting the oscillation of the valve between selected limiting positions in connecting the pressure means through the valve with the opposite sides of the chamber.

References Cited in the file of this patent

UNITED STATES PATENTS

| 939,382 | Beard | Nov. 9, 1909 |
|---|---|---|
| 1,299,001 | Moore | Apr. 1, 1919 |
| 2,230,188 | Ferngren | Jan. 28, 1941 |
| 2,576,747 | Bryant | Nov. 27, 1951 |
| 2,674,006 | Bailey et al. | Apr. 6, 1954 |